(12) United States Patent
Kiguchi et al.

(10) Patent No.: US 7,037,737 B2
(45) Date of Patent: May 2, 2006

(54) METHOD OF MANUFACTURE OF ACTIVE MATRIX SUBSTRATE AND LIQUID CRYSTAL DISPLAY DEVICE

(75) Inventors: Hiroshi Kiguchi, Suwa (JP); Satoru Katagami, Hara-mura (JP); Tomomi Kawase, Shiojiri (JP); Hisashi Aruga, Fujimi-machi (JP); Masaharu Shimizu, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 13 days.

(21) Appl. No.: 10/834,977

(22) Filed: Apr. 30, 2004

(65) Prior Publication Data

US 2004/0203180 A1 Oct. 14, 2004

Related U.S. Application Data

(62) Division of application No. 09/977,340, filed on Oct. 16, 2001, now Pat. No. 6,872,586.

(30) Foreign Application Priority Data

Oct. 17, 2000 (JP) .............................. 2000-316957
Oct. 16, 2001 (JP) .............................. 2001-318207

(51) Int. Cl.
 *H01L 21/00* (2006.01)
(52) U.S. Cl. ......................................... 438/28; 438/30
(58) Field of Classification Search .................... None
 See application file for complete search history.

(56) References Cited

U.S. PATENT DOCUMENTS

| | | |
|---|---|---|
| 5,631,753 A | 5/1997 | Hamaguchi et al. |
| 5,688,146 A | 11/1997 | McGinley et al. |
| 5,706,064 A | 1/1998 | Fukunaga et al. |
| 5,721,601 A * | 2/1998 | Yamaji et al. ............... 349/138 |
| 5,839,188 A | 11/1998 | Pommer |
| 5,984,470 A | 11/1999 | Sakino et al. |
| 6,025,898 A | 2/2000 | Kashicazaki et al. |
| 6,111,623 A | 8/2000 | Sato |
| 6,111,696 A * | 8/2000 | Allen et al. .................. 359/495 |
| 6,224,205 B1 | 5/2001 | Akahira et al. |
| 6,307,606 B1 | 10/2001 | Takii et al. |
| 6,394,578 B1 | 5/2002 | Akahira et al. |
| 6,413,686 B1 | 7/2002 | Kishimoto et al. |
| 6,437,769 B1 * | 8/2002 | Kobayashi et al. ......... 345/102 |
| 6,642,913 B1 * | 11/2003 | Kimura et al. ................ 345/84 |
| 6,863,961 B1 * | 3/2005 | Miyashita et al. .......... 428/203 |
| 6,909,114 B1 * | 6/2005 | Yamazaki ..................... 257/66 |
| 2002/0024493 A1 | 2/2002 | Ozawa et al. |
| 2002/0185967 A1 | 12/2002 | Friend |
| 2003/0031942 A1 | 2/2003 | Elizur et al. |

FOREIGN PATENT DOCUMENTS

| | | |
|---|---|---|
| JP | H-08-036173 A | 2/1996 |
| JP | A-08-076106 | 3/1996 |

(Continued)

*Primary Examiner*—Chandra Chaudhari
(74) *Attorney, Agent, or Firm*—Oliff & Berridge, PLC

(57) ABSTRACT

A manufacturing method of an active matrix substrate which can prevent the complexity of manufacturing processes, widens the range of material choice and allows high manufacturing yield, and a manufacturing method of a liquid crystal display using such active matrix substrate. Conductive colored layers (606 to 608) functioning as pixel electrodes and color filters are formed by a process of discharging, by an ink jet method, a mixed ink of coloring material and conductive material to the formation area of a pixel electrode to be connected electrically to an active element (602).

9 Claims, 16 Drawing Sheets

FOREIGN PATENT DOCUMENTS

| | | |
|---|---|---|
| JP | A-08-313726 | 11/1996 |
| JP | A-8-313726 | 11/1996 |
| JP | H-09-120072 A | 5/1997 |
| JP | A-9-292633 | 11/1997 |
| JP | A-10-148710 | 6/1998 |
| JP | A-10-301129 | 11/1998 |
| KR | 1995-0033602 | 12/1995 |
| KR | 1997-0011947 A | 3/1997 |

* cited by examiner

METHOD OF MANUFACTURE OF ACTIVE MATRIX SUBSTRATE AND LIQUID CRYSTAL DISPLAY DEVICE

This is a Division of application Ser. No. 09/977,340 filed Oct. 16, 2001 now U.S. Pat. No. 6,872,586. The entire disclosure of the prior application is hereby incorporated by reference herein in its entirety.

BACKGROUND OF THE INVENTION

1. Field of the Invention

This invention relates to a method of manufacture of an active matrix substrate, on which are formed thin film transistors (TFTs), thin film diodes (TFDs), and other active elements in matrix form, as well as a method of manufacture of a liquid crystal display device using this active matrix substrate.

2. Description of the Related Art

Liquid crystal display devices, having a structure in which liquid crystals are enclosed between an active matrix substrate and an opposing substrate, are well-known. In such a liquid crystal display device, active elements and pixel electrodes to select and drive-these elements are provided on the active matrix substrate, and an opposing electrode is provided on the opposing substrate. In order to effect color display in such a liquid crystal display device, a transmissive color filter, having red (R), green (G) and blue (B) tints, is arranged for individual display pixels.

In Japanese Patent Laid-open No. H9-292633, the formation of a color filter by imparting hardening ink to the aperture regions between TFTs formed on a substrate using an ink jet method, and the formation on this color filter of transparent pixel electrodes, are described.

However, in the Japanese Patent Laid-open No. H9-292633, formation of the ink layer and formation of the pixel electrodes must be performed separately, involving greater complexity in the manufacturing process.

In order to prevent the active element electrodes from being covered by ink jet discharge prior to formation of the pixel electrodes, the ink jet discharge must be performed after forming a passivation film and light-blocking layer on the entire upper surface of the active elements; however, contact holes must be formed in this passivation film and light-blocking layer for pixel electrodes connected to the active element electrodes, involving greater complexity in the manufacturing process.

On the other hand, in Japanese Patent Laid-open No. 8-313726, colored layers may be used as both a color filter and as pixel electrodes by making them conductive. By this means, formation of the ink layer and formation of the pixel electrodes can be performed in the same operation, and there is no longer a need to form contact holes in a passivation film and light-blocking layer.

However, in the Japanese Patent Laid-open No. H8-313726, patterning is performed by using a conductive resist as the color filter; however, the range of materials which can be selected in order to simultaneously satisfy the three requirements of optimal color adjustment, conductivity, and resist properties is extremely limited. For example, if an ordinary photopolymer-type color resist is mixed with conductive material, the occurrence of radicals due to the photoinitiator may be impeded, so that realization of such a material is difficult.

Also, because exposure, development, and other processes are indispensable for patterning using resist, complexity in the manufacturing process is unavoidable. And, patterning must be used to eliminate unnecessary resist, so that color materials and conductive materials are inevitably wasted.

An object of the present invention is to provide an active matrix substrate manufacturing method, and a method for manufacturing liquid crystal display devices using this active matrix substrate, which avoids such complexity in the manufacturing process, enables a broader range of material selection, and affords higher manufacturing yields.

SUMMARY OF THE INVENTION

In order to resolve the above problems, a method of manufacture of an active matrix substrate of this invention is characterized in that a conductive colored layer which acts as pixel electrodes and as a color filter is formed by a process in which an ink jet method is used to discharge an ink, in which are mixed a color material and a conductive material, in the regions for formation of pixel electrodes to be electrically connected to active elements.

In the manufacturing method, it is preferable that, after forming to a prescribed height an insulating layer constituting a black matrix in a position to cover electrodes other than the one electrode electrically connected to the conductive colored layer in the active element, the process of discharge of the ink be executed.

After forming a reflective layer provided with optical reflectivity at the position at which the conductive colored layer is formed, the process to discharge the ink may be used to manufacture a reflective active matrix substrate.

Also, a semi-transmissive active matrix substrate may be manufactured by forming a gap, which transmits light in the layer thickness direction, in the reflective layer.

In the method of manufacture of the reflective or semi-transmissive active matrix elements, it is preferable that a first insulating layer be formed in positions to cover electrodes other than the one electrode electrically connected to the conductive colored layer in the active element, and that, after forming the reflective layer, which electrically connects the conductive colored layer to the one electrode, on the first insulating layer, and a second insulating layer of prescribed height constituting a black matrix, that the process in which the ink is discharged be executed.

In the method of manufacture of reflective or semi-transmissive active matrix elements, it is preferable that the first insulating layer be formed at positions to cover the entire surface of the active elements, and that the reflective layer be electrically connected to the single electrode via contact holes formed at positions corresponding to the single electrodes in the first insulating layer.

In the manufacturing method, it is preferable that the pixel electrodes formed by discharge of the ink have at least three types of color.

In the manufacturing method, the active elements may be thin film transistors (TFTs), or may be thin film diodes (TFDs).

A method of manufacturing liquid crystal display devices of this invention is characterized in that a liquid crystal layer is injected between an active matrix substrate manufactured by the method and an opposing substrate positioned to oppose the active matrix substrate.

Also, a method of manufacture of electronic equipment of this invention is characterized in that a liquid crystal display device manufactured by the method is used as a display means.

Figure 1:
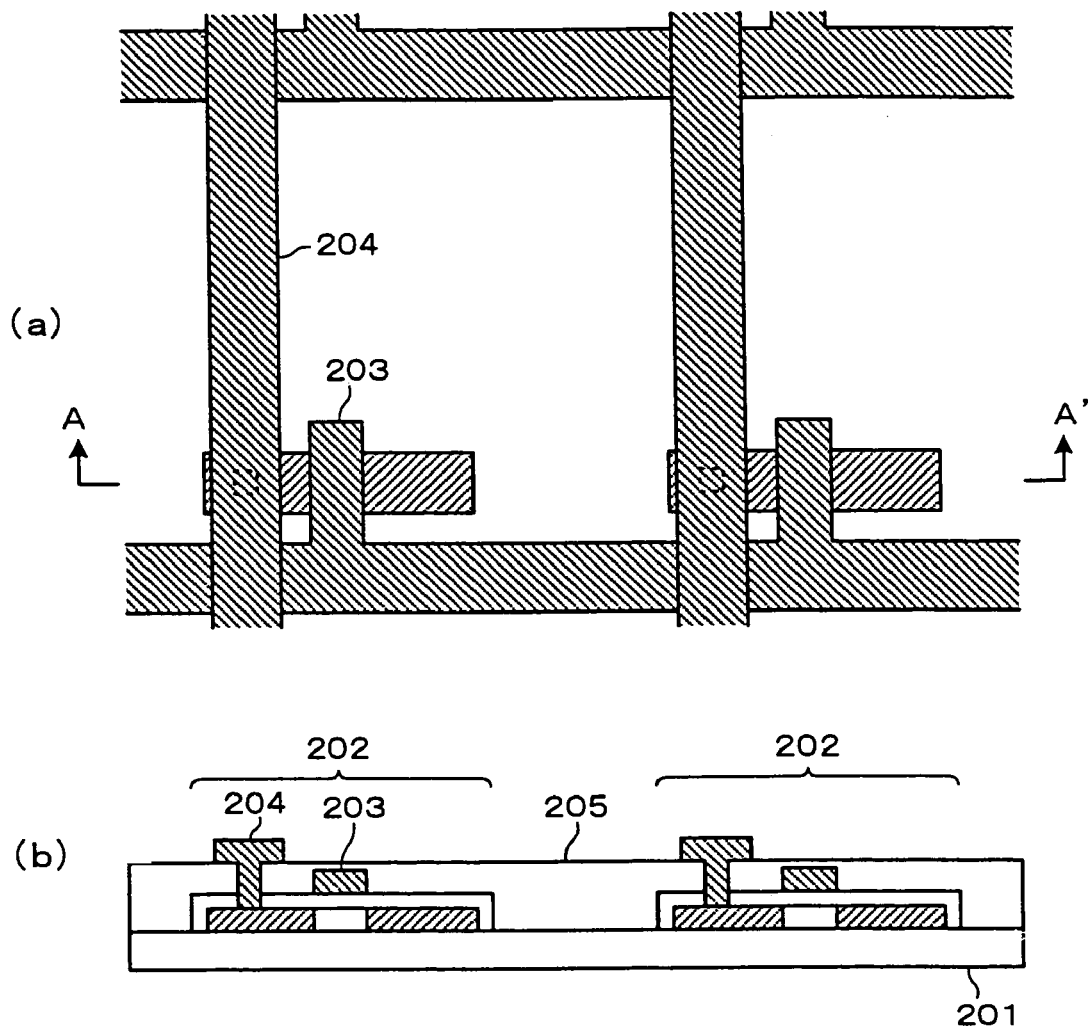
FIG. 1 shows one example of the manufacturing process of a first embodiment.

In the figures, the symbols 201, 401 and 601 are thin film transistor substrates; 801 is a thin film diode substrate; 202 and 602 are TFTs (thin film transistors); 802 is a TFD (thin film diode); 206 through 208, 406 through 408, 606 through 608, and 806 through 808 are conductive colored layers; 209 and 409 are drain regions; 611 is a drain electrode; 412 and 812 are conductive layers; 210, 410, 610 and 810 are active matrix substrates; 217, 417, 617 and 817 are opposing substrates; 218, 418 and 618 are opposing electrodes; 818 is a scan line; 219, 419, 619, and 819 are liquid crystals; 220, 420, 620, and 820 are insulating films; 221, 421, 621, and 821 are alignment films; 200, 400, 600, 800, and 300 are liquid crystal display devices; and 500 is a personal computer (electronic equipment).

DESCRIPTION OF THE PREFERRED EMBODIMENTS

Below, embodiments of this invention are explained in detail, referring to the drawings.

1. First Embodiment

The first embodiment is an embodiment which uses TFTs as active elements.

1-1. Manufacturing Process

FIG. 1 through FIG. 4 are figures showing an example of a manufacturing process of the first embodiment; in each figure, (a) is a plane view, and (b) is a cross-sectional view along line A–A' of (a). First, TFTs 202 are formed on the thin film transistor substrate 201. These TFTs 202 comprise a gate line 203, source line 204, insulating film 205, and other components (FIG. 1).

Figure 2:
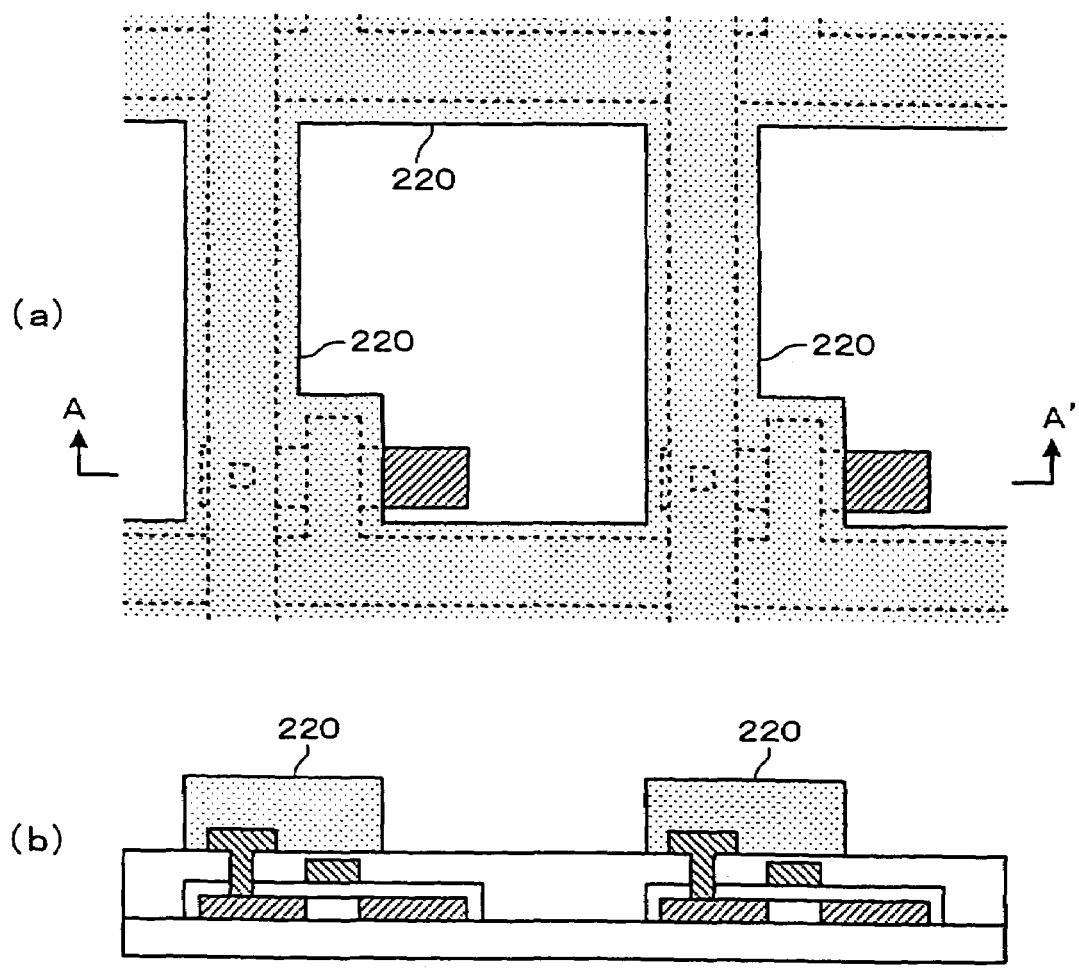
FIG. 2 shows one example of the manufacturing process of the first embodiment.

Next, as shown in FIG. 2, an insulating film 220 is formed to become a protective film for the source lines 204. This insulating film 220 covers a portion of the TFTs 202 (the source lines 204), and is also formed so as to surround the pixel, and thereby functions as a black matrix. By forming this insulating film to a prescribed height, the insulating film later acts as a bank to prevent ink discharged in an ink jet from overflowing into other pixels.

It is preferable that the insulating film 220 be formed so as to cover those electrodes of the TFTs 202 (source and gate electrodes) other than the drain electrode which is to be electrically connected by the conductive colored layer. By this means, when the conductive ink is applied, the conductive ink is connected only to the drain regions, and is not connected to the source or drain electrodes.

Further, it is preferable that the insulating film 220 be formed along the source lines 204 and gate lines 203 which intersect in a matrix form. By this means, the positions of the source lines and gate lines coincide with the black matrix, and an aperture ratio can be maximized. And, by forming the insulating film 220 so as to cover the source lines 204 and gate lines 203, short-circuiting of the source lines 204 or gate lines 203 by the conductive colored layer can be prevented.

Figure 3:
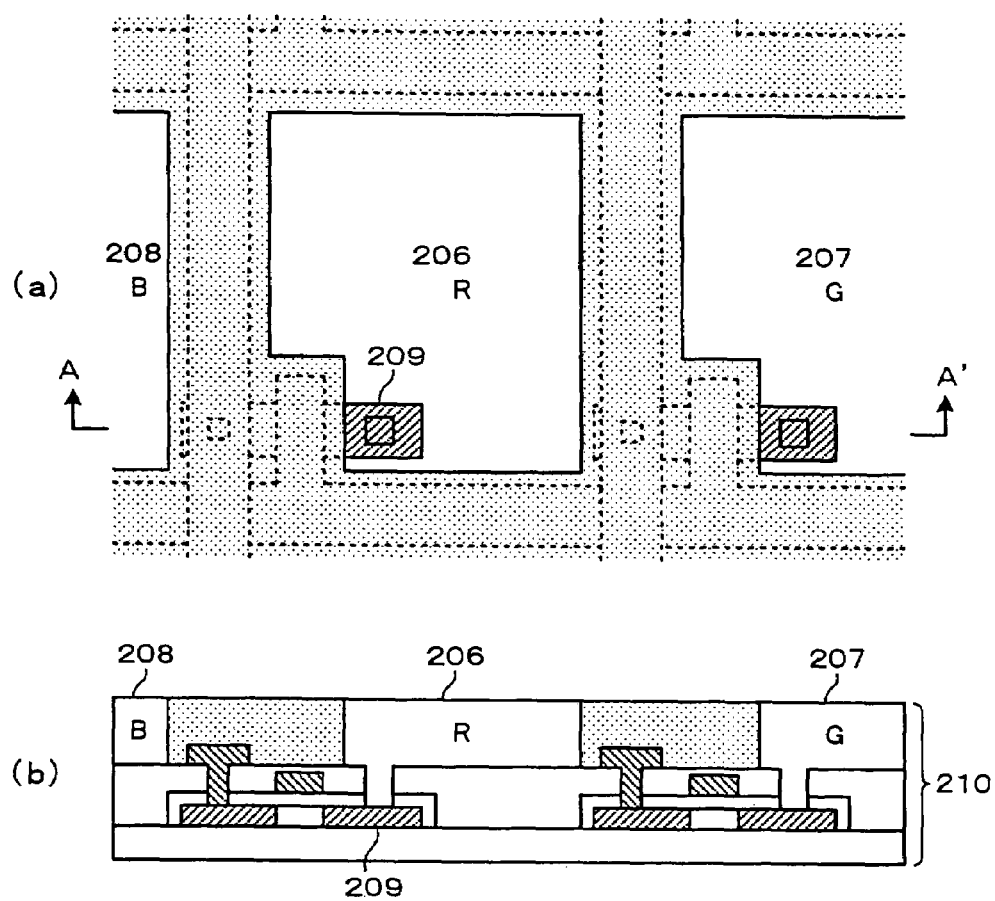
FIG. 3 shows one example of the manufacturing process of the first embodiment.

Next, as shown in FIG. 3, contact holes are opened in the insulating film 205, and then red conductive ink, green conductive ink, and blue conductive ink are discharged into each pixel by an ink jet method. As this conductive ink, for example, ink with fine conductive particles intermixed and dispersed can be used. Ink discharged by the ink jet method is naturally dried in air, and hardened using a hot plate and/or oven. By this means, conductive colored layers 206 through 208 are formed, and an active matrix substrate 210 is completed.

In this embodiment, the inks which serve as the color filter are conductive. Conductive inks can for example be prepared by mixing fine particles of transparent conductive materials such as ITO (indium tin oxide) or $SnO_2$ (tin oxide) into an ink.

The conductive colored layers 206 through 208 thus formed by imparting conductivity to the ink can be used both as a color filter provided on the thin film transistor substrate, and also as pixel electrodes to drive the liquid crystals. To this end, these conductive colored layers 206 through 208 and the drain regions 209 of the TFTs 202 are connected via the contact holes.

Figure 4:
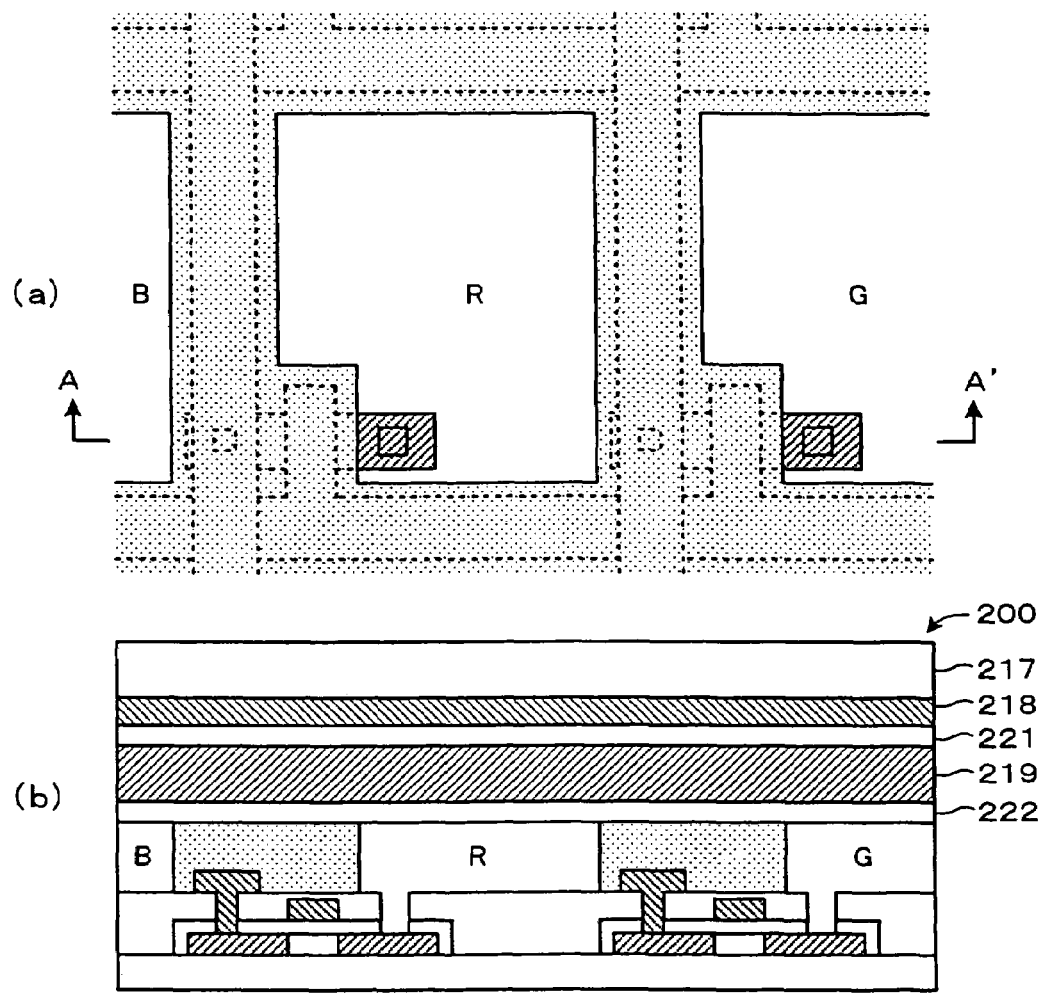
FIG. 4 shows one example of the manufacturing process of the first embodiment.

Then, as shown in FIG. 4, the alignment film 222 is deposited in a layer and subjected to rubbing processing. On the inside of the opposing substrate 217, only an opposing electrode 218 comprising a transparent conductive film and an alignment film 221 are provided. Liquid crystals 219 are injected between the thin film transistor substrate 201 and the opposing substrate 217, to form the liquid crystal display device 200.

In this embodiment, a color filter comprising conductive inks is provided on the thin film transistor substrate. As a result, the need to form a color filter on the opposing substrate is eliminated, and the cost of manufacturing the opposing substrate can be reduced. Also, there is greater tolerance in aligning the thin film transistor substrate with the opposing substrate.

Further, by this embodiment the conductive inks serving as the color filter also serve as pixel electrodes, so that the processes of forming and patterning pixel electrodes can be eliminated. As a result, costs can be reduced, and production yields can be increased.

Also, this embodiment has the following advantages compared with a configuration in which, for example, a color filter is formed comprising color resist or the like on top of pixel electrodes of ITO. That is, after the color filter is formed on top of the pixel electrodes, a voltage is applied to the color filter when driving the liquid crystals, and voltage division results in reduction of the voltage applied to the liquid crystals (the effective voltage), which may cause degradation of image quality, on the other hand, in this embodiment the conductive colored layers 206 through 208 serve as both pixel electrodes and as the color filter, so that this problem of image quality degradation can be effectively prevented.

Further, by this embodiment the aperture ratio can be increased compared with a configuration in which the color filter is formed on top of the pixel electrodes. In a configuration in which the color filter is formed on top of the pixel electrodes, a margin for alignment of the pixel electrodes and the color filter is required; but in this embodiment, no such alignment margin is necessary, and so the aperture ratio can be increased.

1-2. Conductive Colored Layers

As in the embodiment, the conductive colored layers can be formed by dispersing pigments or other coloring material and ITO or other conductive material in a solvent.

When dispersing coloring material and conductive material in a solvent, the fraction of solid components of the coloring material, conductive material and the like must be held below a fixed value. This is because if the fraction of solid components in the conductive ink is high, the pot life (time over which a usable liquid state is maintained) is shortened. That is, solid components of coloring material or conductive material may coagulate, preventing discharge of the conductive ink by the ink jet method or worsening the discharge characteristics, and impeding production at the factory or the like.

Hence it is preferable that the solid component fraction be approximately 10% or less, and more preferable that the solid component fraction be approximately 6% or less. In order to reduce the solid component fraction, the amount of conductive material included in the resist may be reduced; however, too much reduction will cause the resistivity of the conductive colored layers to increase. Hence the relation between pot life and resistivity must be balanced optimally when determining the solid component fraction.

When dispersing pigments or the like in a solvent, there are no particular limitations, but as red-color pigments, for example, perylene pigments, anthraquinone pigments, dianthraquinone pigments, azo pigments, diazo pigments, quinacridone pigments, anthracene pigments and the like may be used. As green-color pigments, phthalocyanine halide pigments and the like may be used. As blue-color pigments, metal phthalocyanine pigments, indanthrone pigments, indophenol pigments and the like may be used. In addition, purple, yellow, cyan, magenta, and other pigments may also be employed.

1-3. Conductivity

The conductive colored layers of this embodiment also have a prescribed impedance (resistance and capacitance). Hence there is the problem that the effective voltage applied to the liquid crystals is reduced due to the intervention of the conductive colored layers between the drain region and the liquid crystals. It is therefore preferable that the resistivity of the conductive colored layers be made as low as possible.

The resistivity of the conductive colored layers depends on the size of the liquid crystal panel, the desired display characteristics and other factors, but should preferably be approximately $1 \times 10^7$ $\Omega \cdot$cm or less, and more preferably approximately $1 \times 10^6$ $\Omega \cdot$cm or less.

1-4. Shape of Fine Conductive Particles and Related Issues

It is preferable that the conductive material included in the colored layers be in the form of fine particles. This is in order to minimize the reduction in transmissivity of the color resist arising from inclusion of the conductive material. For a similar reason, it is preferable that the dispersed conductive material be transparent, Hence ITO, $SnO_2$ and the like are optimal as conductive materials. Or, these can be mixed with carbon, gold, or silver for use.

When forming conductive material into fine particles, it is preferable that the shape of the fine particles be disc-shaped or rod-shaped rather than spherical. This is because if particles are formed in disc or rod shapes, the area of overlap between neighboring fine particles can be made large, and as a result electrical currents can flow more freely, and the resistivity can be lowered. That is, the fraction of dispersed fine conductive particles should be raised in order to lower the resistivity; but if it is raised too high, the transmissivity may be decreased, color characteristics may be worsened, or the above-described shortened pot life or other problems may arise. If particles have disc, rod, or other shapes such that the overlapping areas of neighboring particles are large, then the resistivity can be lowered a without greatly increasing the fraction of fine conductive particles.

In order to achieve uniform dispersion of the conductive material, it is preferable that the fine conductive particles be subjected to hydrophobic processing, and that the particle surfaces be made hydrophobic. If the fine conductive particles have a hydrophilic surface, because many pigments and other coloring material have a hydrophobic surface, secondary coagulation of fine hydrophilic particles may occur, so that it may not be possible to obtain a uniform disperse state. Hydrophobic processing is performed using coupling agents, for example; as coupling agents, silane, titanium oxide, chromium, and various other materials can be used.

The black matrix in this embodiment is arranged as a light-blocking layer between the pixels of the color filter, arranged in a stripe pattern, mosaic pattern, triangle pattern, four-pixel pattern, or other pattern.

1-5. Black Matrix

In this embodiment, it is preferable that the insulating film constituting the black matrix be a silicon oxide film. Silicon oxide film is widely used as an insulating film in processes to manufacture thin film transistors, LSIs and other devices, and offer excellent heat and chemical resistance.

That is, compared with the materials used in conventional black matrixes, the manufacturing process is compatible with that used for thin film transistors and the like. Particularly when the black matrix is formed on the thin film transistor substrate, such compatibility may be a problem. This is because the black matrix is formed using the same manufacturing process as that used for thin film transistors.

Hence if the silicon oxide film which is widely used in the manufacture of thin film transistors is used as the black matrix material, then no great consideration need be given to the etching fluid, temperature or other factors used after the black matrix formation process. Consequently selection of the chemicals and the like used in the manufacturing process becomes easier. Even when the insulating film in thin film transistors and the black matrix have a multilayer structure, the same material is used in both, so that the adverse effects of strain induced by stress or other factors can be reduced.

The silicon oxide film constituting the black matrix can also serve as the insulating film (source line protective film) of the thin film transistors.

In this embodiment, in addition to the silicon oxide film, titanium oxide film or other films of material equivalent to silicon oxide can be adopted; various materials can be employed, so long as there is good manufacturing process compatibility with thin film transistors and other components.

In this embodiment, it is preferable that pigments be used as the coloring material comprised by the insulating film. This is because pigments have comparatively good heat resistance, so that when the heat resistance of the color filter and other components is improved, the heat resistance of the coloring material should also be similarly improved. However, the coloring material comprised by the insulating film is not limited to this; for example, dyes may be used as well. In this embodiment, carbon is conceivable as a black-color pigment for inclusion in the insulating film.

2. Second Embodiment

In the second embodiment, a metal or other conductive layer intervenes between the conductive colored layers and the thin film transistor drain regions.

FIG. 5(a) is a plane view, and FIG. 5(b) is a cross-sectional view along line A–A', of an active matrix substrate and liquid crystal display device of the second embodiment. The method of manufacture differs from the first embodiment in that, after opening contact holes to the drain regions 409 in the insulating film 405, a conductive layer 412, electrically connecting the drain regions 409 and the conductive colored layers 406 through 408, is formed. This conductive layer 412 is of metal or similar material. After forming the conductive layer 412, the conductive colored layers 406 through 408 which serve both as the color filter and as pixel electrodes are formed, to complete the active matrix substrate 410. The alignment film 422, opposing substrate 417, opposing electrode 418, alignment film 421, and liquid crystals 419 are formed similarly to the above-described first embodiment, to obtain the liquid crystal display device 400.

By this embodiment, good contact can be ensured between the conductive colored layers 406 through 408 serving as the pixel electrodes, and the drain region 409, which enables reduction of contact resistance and so on. As a result, the effective voltage applied to the liquid crystals can be increased, and the display characteristics can be improved. Here, as the material of the conductive layer 412, it is preferable that a material be used which can adequately reduce the contact resistance with the drain region and the contact resistance with the conductive colored layers.

2-1. First Modification

This embodiment is not limited to the above; the conductive layer 412 may be formed at the time of formation of the source lines 404, of the same material as the source lines 404. That is, when forming a pattern for the source lines 404, a pattern is also formed for a conductive layer 412 of the same material as the source lines 404. Then, the conductive colored layers 406 through 408 are formed. Through this method of forming a conductive layer 412 of the same material as the source lines 404, there is no longer a need to add new photolithography and etching processes to form the conductive layer, so that the number of processes can be reduced and the manufacturing yield can be raised.

In this embodiment, the conductive layer 412 of metal or the like is drawn out from the contact holes, and the size of the area of contact with the conductive colored layer 406 is determined such that the contact resistance with the conductive ink is sufficiently low. However, when the conductive layer 412 comprises a non-translucent material, if this contact area is made too large the aperture ratio is decreased; hence the size of the contact area must be determined according to the required contact resistance and aperture ratio.

2-2. Second Modification

Figure 5:
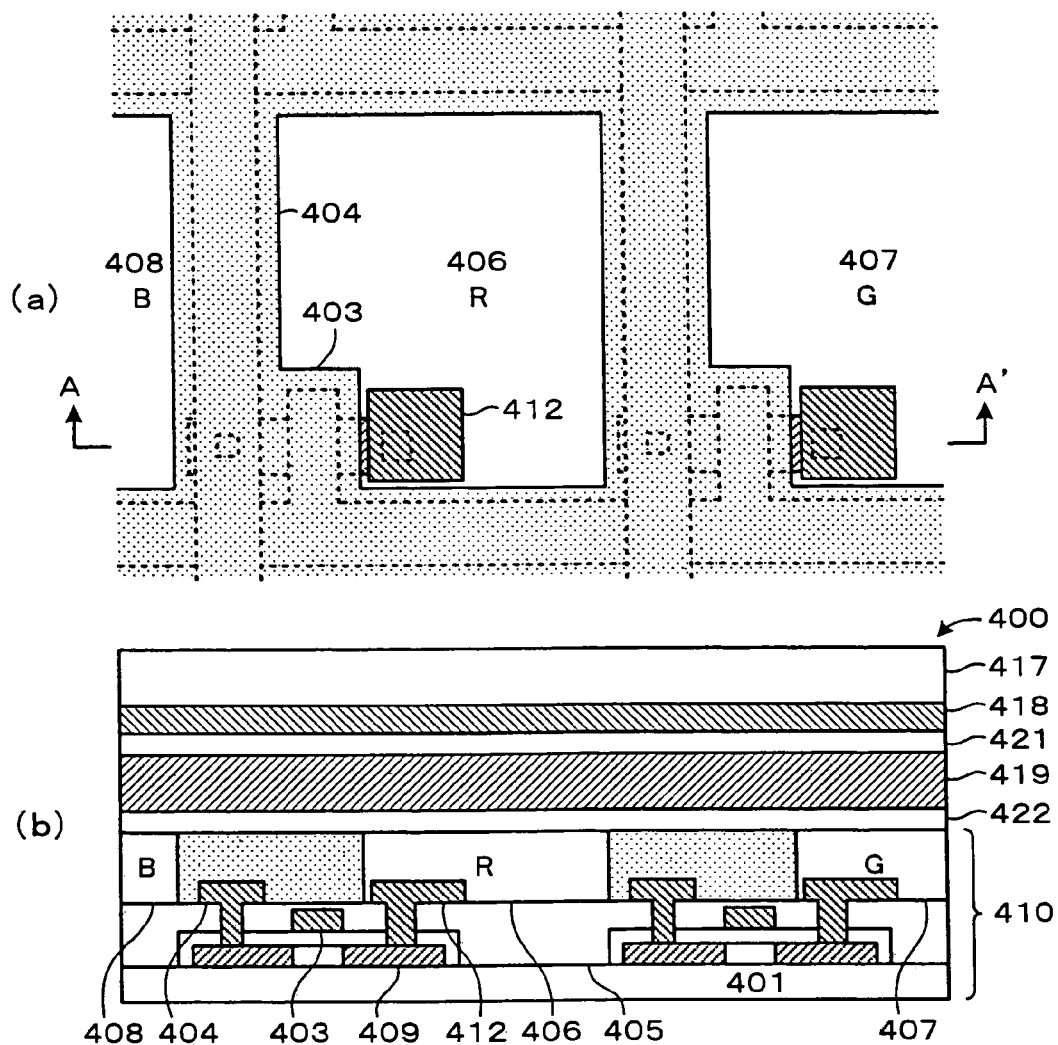
FIG. 5(a) is a plane view.
FIG. 5(b) is a cross-sectional view along line A–A', of the active matrix substrate and liquid crystal display device in a second embodiment.

The conductive layer 412 may be formed only on the periphery of contact holes, as in FIG. 5; however, the conductive layer 412 may also be formed on the periphery of the conductive colored layers 406 serving as pixel electrodes. By this means, the parasitic resistance between the drain region 409 and the pixel electrode can be reduced, and degradation of image quality can be prevented.

When forming the conductive layer 412 on the periphery of the conductive colored layers 406, the conductive layer 412 can also be used as a portion of the black matrix. In this case, the gate lines 403 and source lines 404 become other portions of the black matrix.

2-3. Third Modification

Further, the conductive layer 412 may be formed from ITO over the entire lower surfaces of the conductive colored layers 406 through 408. As a result, even if the resistivity of the conductive colored layers 406 through 408 is high, the actual resistance is only the resistance resulting from the thickness of the conductive colored layers, so that reduction of the effective voltage applied to the liquid crystals can be effectively prevented.

2-4. Fourth Modification

Further, if the conductive layer 412 is formed over the entire lower surfaces of the conductive colored layers 406 through 408, and the conductive layer 412 is formed from a metal or other non-translucent material, then a reflective-type active matrix liquid crystal display device can be configured. When fabricating a reflective-type active matrix liquid crystal display device, it is preferable that the material of the conductive layer 412 have as high a reflectivity as possible.

In conventional reflective-type liquid crystal display devices, the color filter is formed on the opposing substrate. However, in a reflective-type liquid crystal display device, reflected light is the only light source, so that a higher embodiment ratio is desired. In this embodiment, the aperture ratio can be increased by incorporating the color filter in the thin film transistor substrate 401. And, by making the color filter conductive, the problem of voltage division arising from intervention of the color filter between the pixel electrodes and liquid crystals can be prevented.

It is preferable that the liquid crystals 419 enclosed to configure a reflective-type liquid crystal display device be polymer-disperse liquid crystals (PDLCs). As opposed to TN liquid crystals, PDLCs enable control of light transmission through the scattering strength, and have the advantage of not requiring a polarizer. By eliminating the need for a polarizer, the aperture ratio can be raised, and the device manufacturing cost can be reduced. PDLCs can be realized by dispersing liquid crystal molecules in polymers to approximately micron order, or by incorporating liquid crystals in a polymer network.

3. Third Embodiment

In the third embodiment, the TFTs which are the active elements are used in a form differing from that described above. The difference with the first and second embodiments is that the positional relationship of the TFT gate electrode and the source and drain electrodes is vertically inverted.

Figure 6:
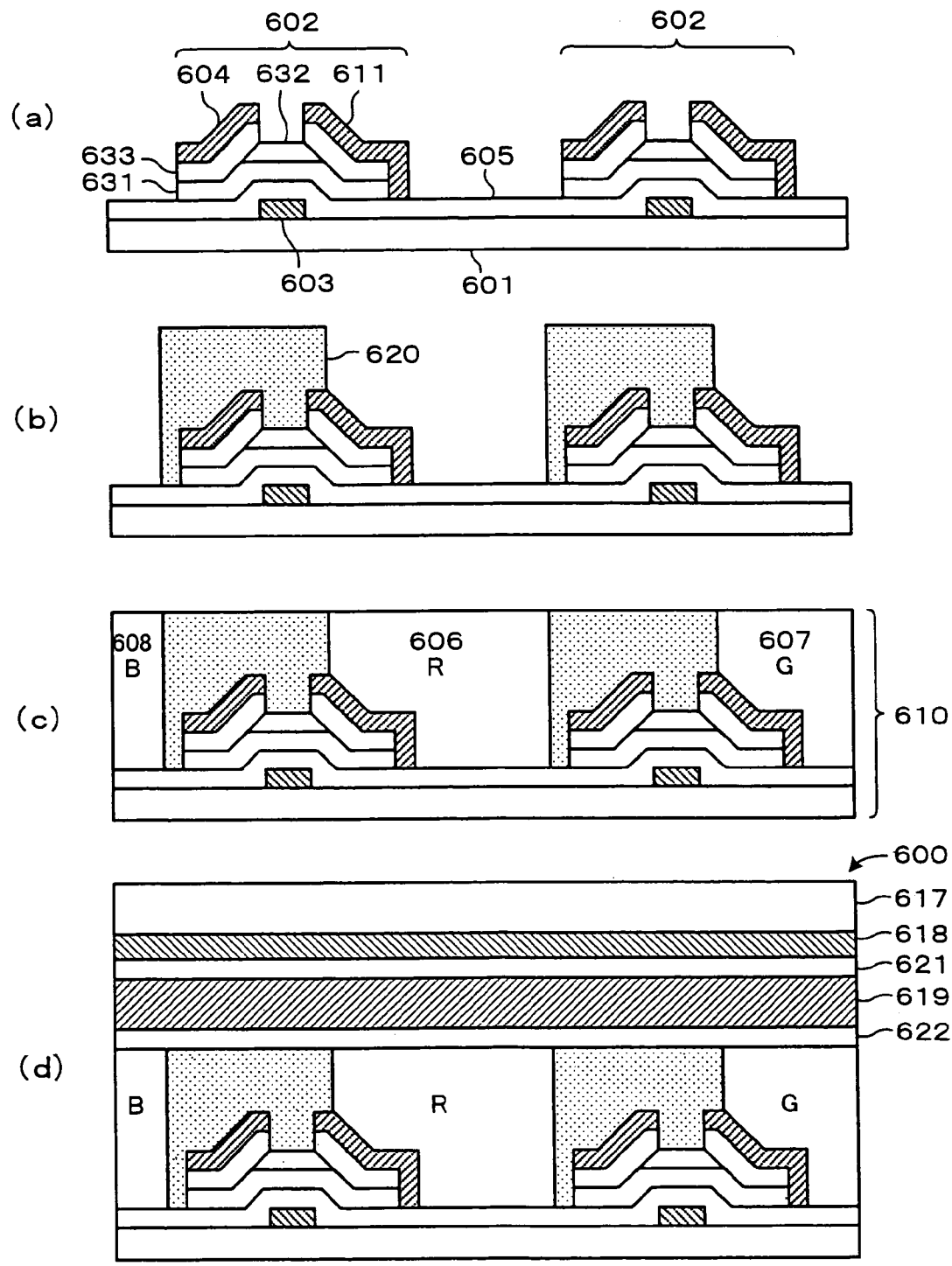
FIG. 6 is a cross-sectional view of a process for manufacturing an active matrix substrate and liquid crystal display device in a third embodiment.

FIG. 6 is a cross-sectional view of processes to manufacture the active matrix substrate and liquid crystal display device of the third embodiment. As shown in FIG. 6(*a*), the TFT 602 is fabricated by forming a gate electrode 603, gate insulating film 605, amorphous silicon film 631, etching protective film 632, Ohmic layer 633, source electrode 604 and drain electrode 611 on the thin film transistor substrate 601.

Next, an insulating film 620 is formed on the source electrode 604, as shown in FIG. 6(*b*). This insulating film also serves as the black matrix, and in addition acts as a bank to prevent applied ink from overflowing into other pixels.

Then, red, green and blue conductive inks are selectively discharged by the ink jet method into each pixel, and are dried and hardened, as shown in FIG. 6(*c*). By this means, the conductive colored layers 606, 607, 608, which serve as both pixel electrodes and as the color filter, are formed, to complete the active matrix substrate 610.

Finally, the alignment film 622 is applied and subjected to rubbing processing, as shown in FIG. 6(*d*). On the inside of the opposing substrate 617, an opposing electrode 618 comprising a transparent conductive film and an alignment film 621 are provided. Liquid crystals 619 are enclosed between the thin film transistor substrate 601 and the opposing substrate 617 to obtain a liquid crystal display device 600.

In this embodiment, the drain electrodes 611 are positioned on the upper surface of the TFTs 602, so that no contact holes for connection to pixel electrodes are needed, with the advantage that manufacturing processes are simplified.

The TFT structure is not limited to those described in the above embodiments; various other structures can be adopted, including inverted-type and normal-type amorphous silicon thin film transistor structures, and planar-type and normal-type polysilicon (polycrystalline silicon) thin film transistor structures.

3-1. Fifth Modification

Figure 7:
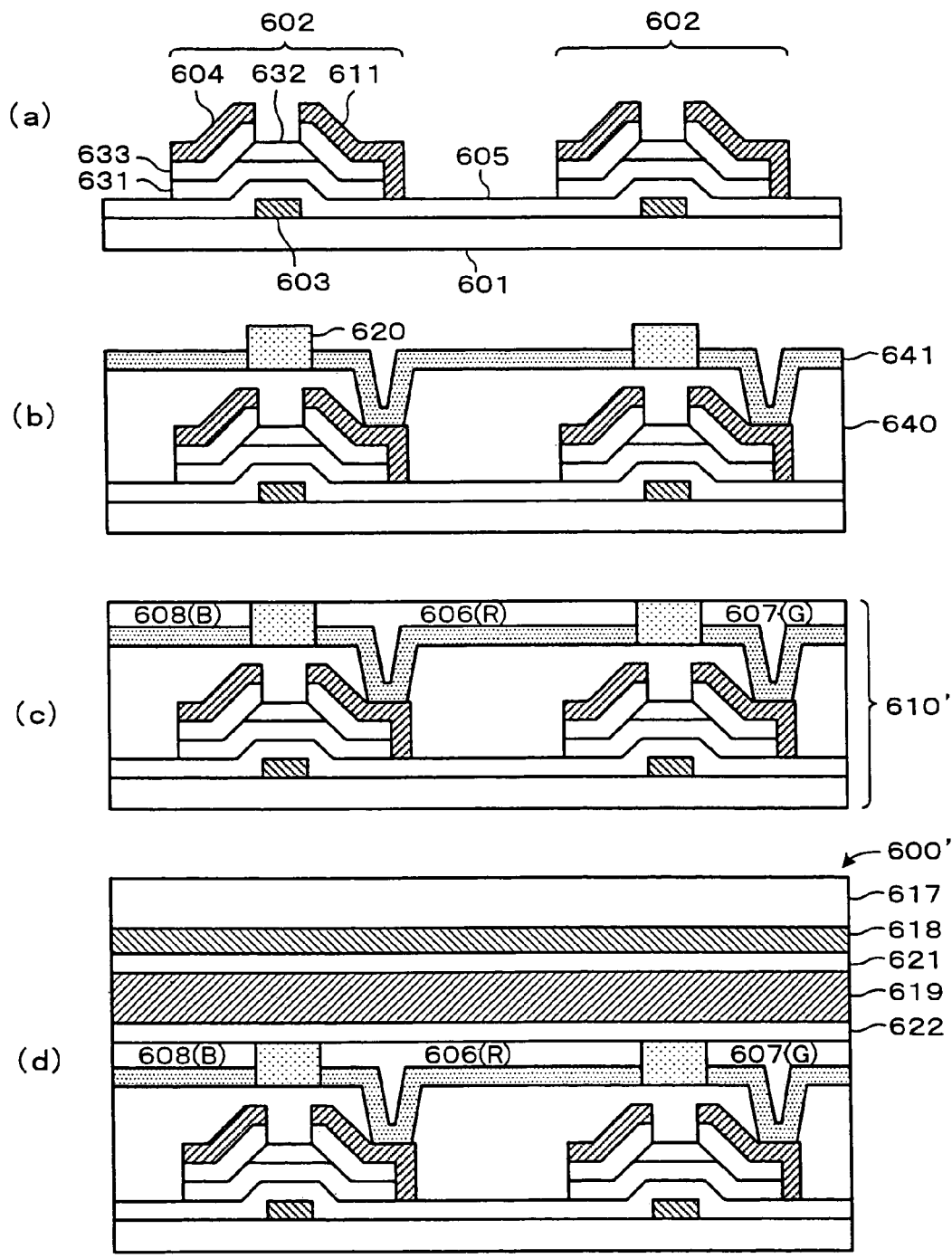
FIG. 7 is a cross-sectional view of a process for manufacturing an active matrix substrate and liquid crystal display device in a modification of the third embodiment.

FIG. 7 shows a modification of the third embodiment. Portions which are similar to those in FIG. 6 are assigned the same symbols, and explanations are omitted. In this modification, a reflective-type liquid crystal display device is obtained by providing an electrode 641, with light-reflecting properties, so as to be electrically connected with the drain electrodes 611 of the third embodiment.

First, as shown in FIG. 7(*a*), the TFT 602 is formed comprising a source electrode 604 and drain electrode 611, similarly to FIG. 6(*a*).

Next, as shown in FIG. 7(*b*), the insulating film 640 is formed. When fabricating a reflective-type liquid crystal display device, a configuration is also possible in which this insulating film 640 is not provided. However, it is preferable that the efficiency of use of reflected light in a reflective-type liquid crystal display device be increased. That is, it is preferable that the area of the portion acting as pixel electrodes be broadened. Hence the insulating film 640 is formed in order that the portion above the neighboring transistor or above the electrode constituting the wiring (in FIG. 7, the source electrode 604) also act as the pixel electrode.

Because this embodiment concerns a reflective-type liquid crystal display device, the insulating film 640 need not be translucent.

After forming the insulating film 640, contact holes are opened in the insulating film 640 leading to the drain electrodes 611, and a conductive layer 641 for electrical connection to the drain electrodes 611 is formed.

In order to obtain a reflective-type liquid crystal display device, this conductive layer 641 is formed from a material such as aluminum (Al) with as high an optical reflectivity as possible. Also, though not shown in the figure, a diffused reflective surface, having fine protrusions and depressions, is formed in the surface of the conductive layer 641 in order that the display quality of the reflective liquid crystal display device be more satisfactory.

Similar, to the example of FIG. 6, an insulating film 620 is formed. However, in contrast with the example of FIG. 6, there is no need to cover the entire source electrode 604. This insulating film 620 also serves as the black matrix, and in addition acts as a bank to prevent overflow of the applied ink into other pixels.

As shown in FIG. 7(*c*), red, green and blue conductive inks are selectively discharged by the ink jet method into each pixel, and are dried and hardened. By this means, conductive colored layers 606, 607, 608, which function both as pixel electrodes and as the color filter, are formed, to complete the reflective-type active matrix substrate 610'.

Finally, as shown in FIG. 7(*d*), the alignment film 622 is formed and is subjected to rubbing processing. On the inside of the opposing substrate 617, an opposing electrode 618 comprising a transparent electrode film, and an alignment film 621 are provided. Liquid crystals 619 are enclosed between the thin film transistor substrate 601 and the opposing substrate 617 to obtain the reflective-type liquid crystal display device 600'.

3-2. Sixth Modification

Figure 8:
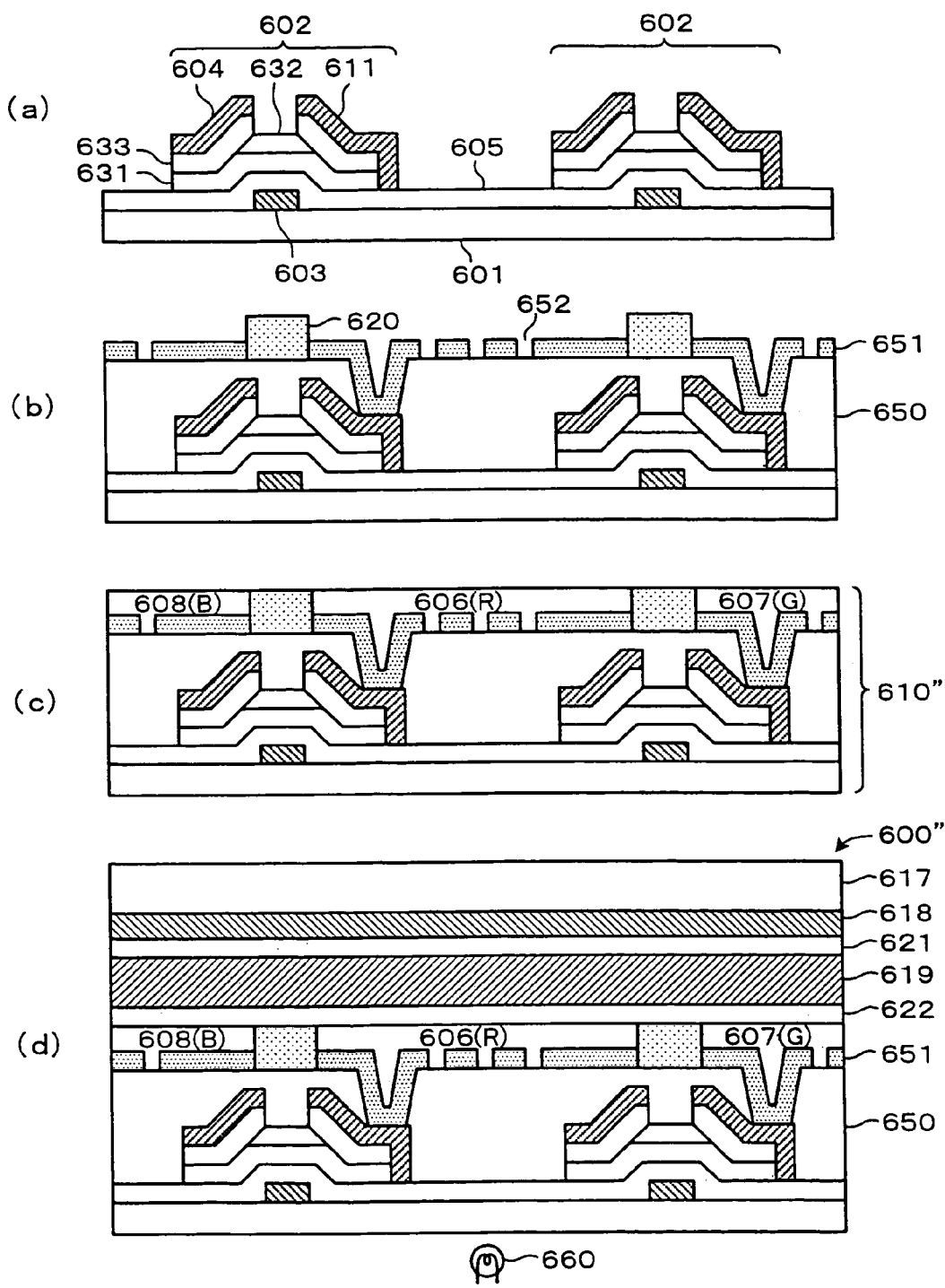
FIG. 8 is a cross-sectional view of a process for manufacturing an active matrix substrate and liquid crystal display device in another modification of the third embodiment.

FIG. 8 shows another modification of the third embodiment. Components similar to those in FIG. 6 and FIG. 7 are assigned the same symbols, and explanations are omitted. In this modification, a semi-transmissive active matrix-type liquid crystal display device is configured by forming the conductive layer 641 of the fifth modification from metal or another non-translucent material, and by forming this layer in a shape so as to impart partial translucence, as conductive layer 651.

As shown in FIG. 8(*a*); similarly to FIG. 6(*a*) and FIG. 7(*a*), TFTs 602 comprising a source electrode 604 and drain electrode 611 are formed.

Then, as shown in FIG. 8(*b*), the insulating film 650 is formed. This modification concerns a semi-transmissive liquid crystal display device which utilizes both reflected light and transmitted light for display; hence the insulating film 650 is formed from material having optical transmissivity. A configuration in which the insulating film 650 is not formed can also be adopted. However, for reasons similar to the reasons why it is preferable to form the insulating film 640 in the fifth modification, in this modification also it is preferable that the insulating film 650 be formed.

After forming the insulating film 650, contact holes leading to the drain electrodes 611 are opened in the insulating film 650, and the conductive layer 651 for electrical connection to the drain electrodes 611 is formed.

In order to obtain a semi-transmissive liquid crystal display which also utilizes reflected light for display, this conductive layer 651 is formed from aluminum (Al) or some other material with as high an optical reflectivity as possible. Though not shown, in this modification also a diffused reflective surface, having fine protrusions and depressions, is formed in the surface of the conductive layer 651 in order that the display quality when utilizing reflected light for display be more satisfactory.

A difference from the fifth modification is the fact that slits 652 are formed in the conductive layer 651, in order that light is partially transmitted. These slits 652 are formed in the process of patterning the conductive layer 651.

The shape which imparts translucence to the conductive layer 651 is not limited to slits, and may be any shape, so long as there is partial removal of the conductive layer 651. Also, the area of partial removal of the conductive layer 651 is determined according to the value to be set for the transmittance for light passing through pixel regions (light from the backlight).

Next, the insulating film 620 is formed, similarly to the example of FIG. 7. This insulating film 620 also serves as the black matrix, and in addition acts as a bank to prevent applied ink from overflowing into other pixels.

Then, as shown in FIG. 8(c), red, green, and blue conductive inks are selectively discharged by an ink jet method into each pixel, and are dried and hardened. By this means, conductive colored layers 606, 607, 608, which function both as pixel electrodes and as the color filter, are formed, to complete the semi-transmissive active matrix substrate 610".

Finally, as shown in FIG. 8(d), the alignment film 622 is formed and is subjected to rubbing processing. Also, an opposing electrode 618 comprising a transparent conductive film, and an alignment film 621, are provided on the inside of the opposing substrate 617. Liquid crystals 619 are enclosed between the thin film transistor substrate 601 and the opposing substrate 617.

A backlight 660 which irradiates light from the side of the thin film transistor substrate 601 is provided, to obtain the semi-transmissive liquid crystal display device 600".

4. Fourth Embodiment

In a fourth embodiment, TFDs are used as the active elements.

FIG. 9 through FIG. 12 are figures showing an example of a manufacturing process of the fourth embodiment; in each figure, (a) is a plane view, and (b) is a cross-sectional view along line A–A'. First, the thin film diode substrate 801 is formed from, for example, glass, plastic, ceramic, semiconductor wafer, or other insulating material. This thin film diode substrate 801 must be transparent in the case of a transmissive-type liquid crystal display device, but need not be transparent in the case of a reflective-type liquid crystal display device.

Figure 9:
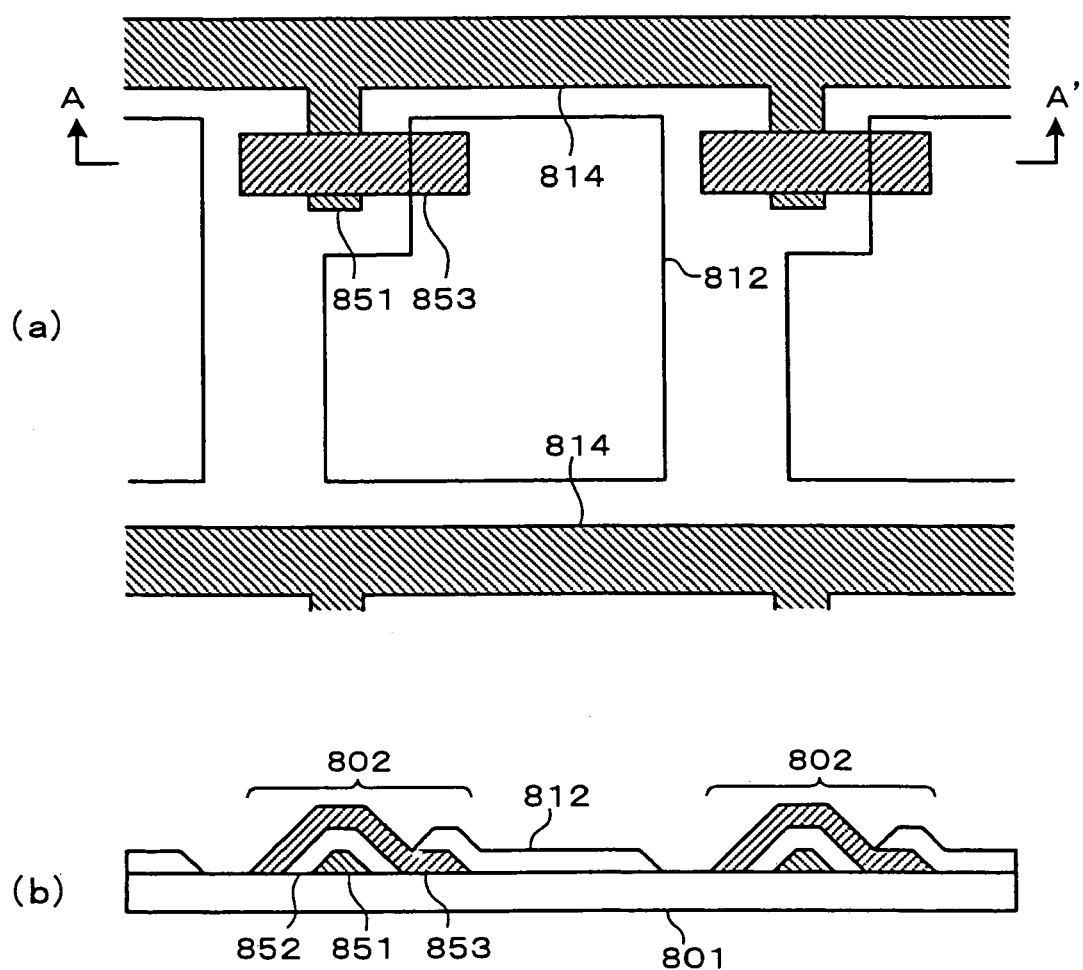
FIG. 9 shows one example of the manufacturing process of a fourth embodiment.

As shown in FIG. 9, the signal lines 814 and first conductive film 851 of the TFDs 802 are formed in a prescribed pattern on the thin film diode substrate 801. Specifically, tantalum or a tantalum-based alloy is deposited by sputtering or by electron beam evaporation, and is formed in a prescribed pattern by reactive ion etching, chemical dry etching or a similar method.

The signal line 814 is used as a scanning signal line; a plurality of signal lines 814 are provided in parallel, in a prescribed pattern, on the thin film diode substrate 801, and extend to the position at which the driver IC of a scanning signal driving circuit, not shown, is located.

The first conductive film 851 is provided on the thin film diode substrate 801, extending from the signal lines 814, and formed in connection with the signal lines 814.

Prior to this patterning, a tantalum oxide protective oxide film may if necessary be formed on the entire surface of the thin film diode substrate 801 prior to patterning. This protective oxide film can be formed by thermal oxidation of a tantalum film deposited by sputtering, by sputtering of a target consisting of tantalum oxide, or by some other method.

Next, the thin film diode substrate 801 is placed in an electrolytic solution of citric acid or the like, anodic oxidation of the signal lines 814 and the first conductive film 815 is performed, and by forming a tantalum oxide film on these surfaces, an insulating film 852 is formed on the surface of the first conductive film 851.

Next, chromium (Cr) is sputtered onto the entire surface of the thin film diode substrate 801 to form a chromium film, which is then etched to pattern a second conductive film 853 in a prescribed pattern. By forming this second conductive film 853, the TFDs 802, which are two-terminal nonlinear elements, are formed. As a result, the first conductive film 851 and the second conductive film 853 enclose the insulating film 852 and are capacitively coupled. Signals from the driver IC are transmitted from the signal line 814 to the first conductive film 851, and are input to the TFDs 802.

The conductive layer 812 is formed in a prescribed pattern on this thin film diode substrate 12, extending over nearly the entire area of each pixel. The conductive layer 812 consists of ITO when, for example, a transmissive-type liquid crystal display device is to be fabricated. When a reflective-type liquid crystal display device is to be fabricated, the conductive layer 812 consists of aluminum (Al), and a diffused reflective surface, having fine protrusions and depressions, is formed in the surface.

The conductive layer 812 overlaps with the second conductive film 853 at positions of TFDs 802, and is connected with the TFDs 802. Signals from the signal lines 814 are input to the conductive layer 812 via the TFDs 802.

Figure 10:
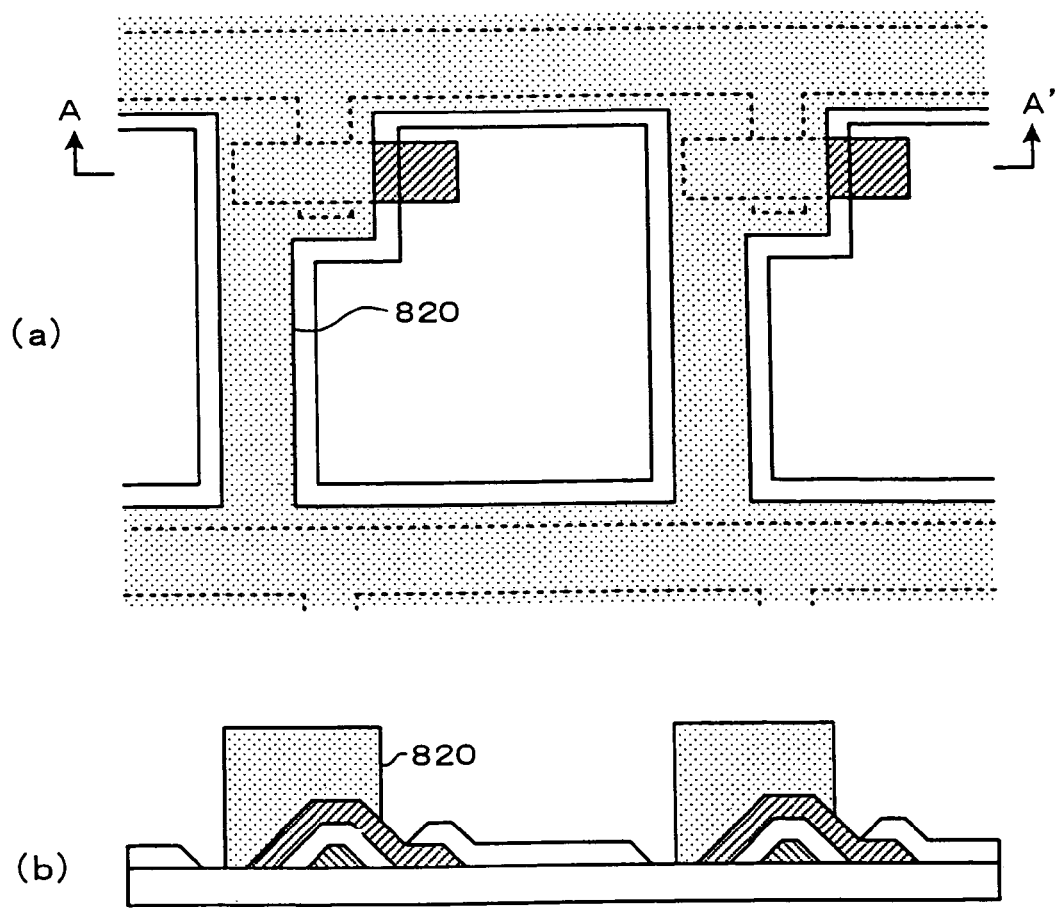
FIG. 10 shows one example of the manufacturing process of the fourth embodiment.

Next, as shown in FIG. 10, an insulating film 820 covering the signal lines 814 is formed. As shown in FIG. 10(a), this insulating film 820 is formed in the boundary portions between pixels so as to function as the black matrix and as a bank, in addition to the signal lines 814.

Figure 11:
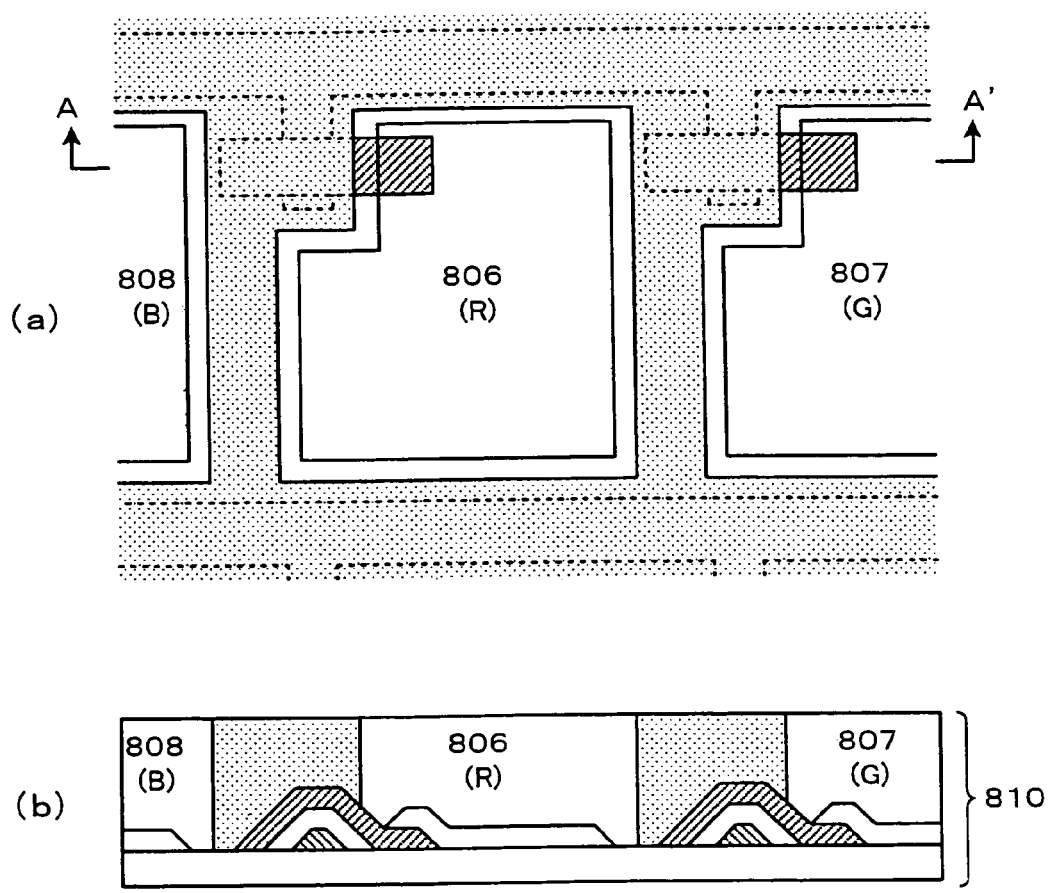
FIG. 11 shows one example of the manufacturing process of the fourth embodiment.

As shown in FIG. 11, conductive inks are then discharged by the ink jet method into each pixel, dried and hardened to form the conductive colored layers 806 through 808, completing the active matrix substrate 810.

Figure 12:
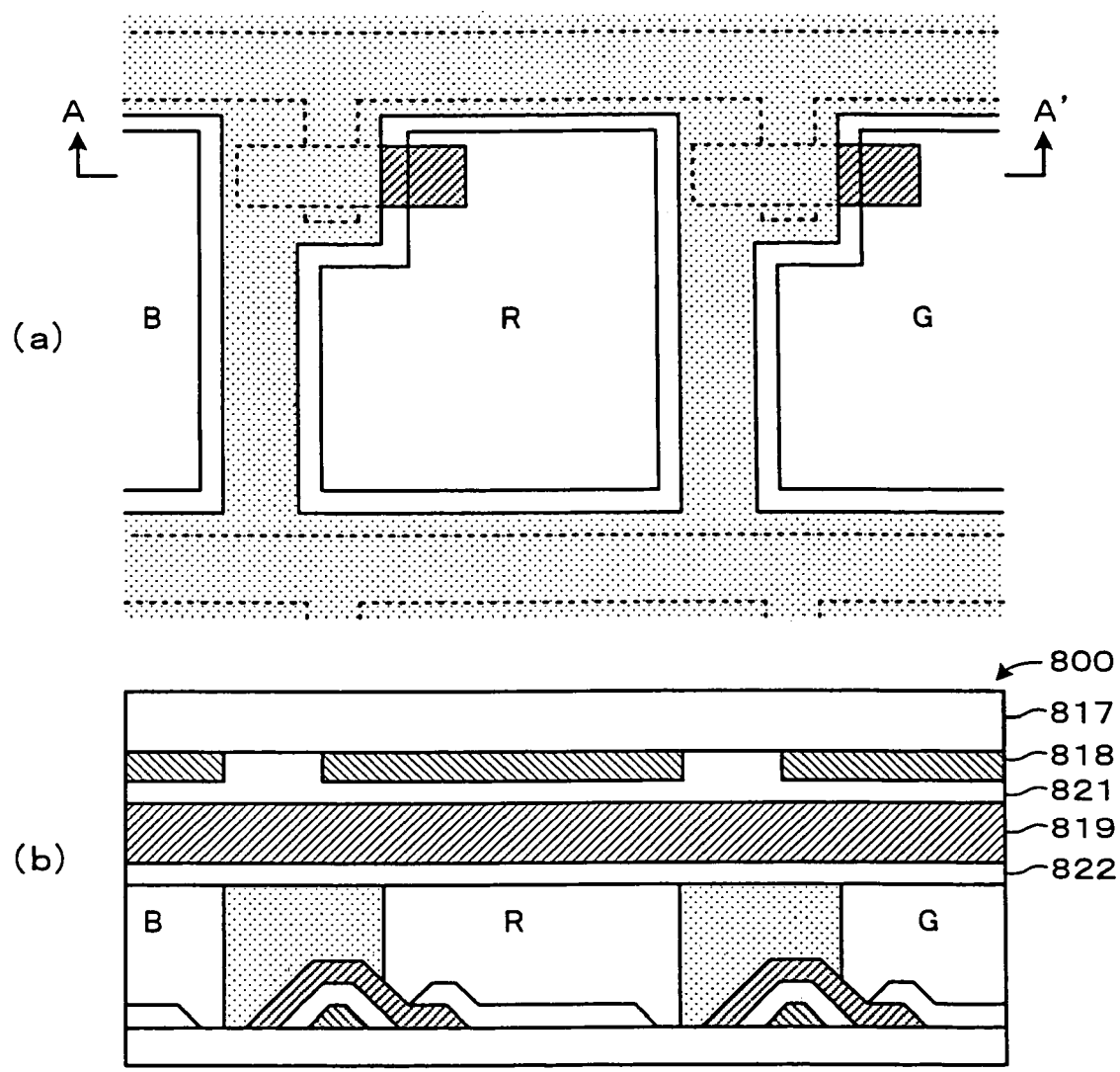
FIG. 12 shows one example of the manufacturing process of the fourth embodiment.

An alignment film 822 is then formed on the active matrix substrate 810 and subjected to rubbing processing, as shown in FIG. 12. Scan lines 818 are provided on the transparent opposing substrate 817, on top of which an alignment film 821 is formed and subjected to rubbing processing; the active matrix substrate 810 and opposing substrate 817 are placed facing each other, and liquid crystals 819 are enclosed between them to form the liquid crystal display device 800.

A polarizer, not shown, is provided on the outside of the opposing substrate 817. In the case of a transmissive-type active matrix substrate, a backlight is added, to obtain a liquid crystal display device.

4-1. Seventh Modification

Figure 13:
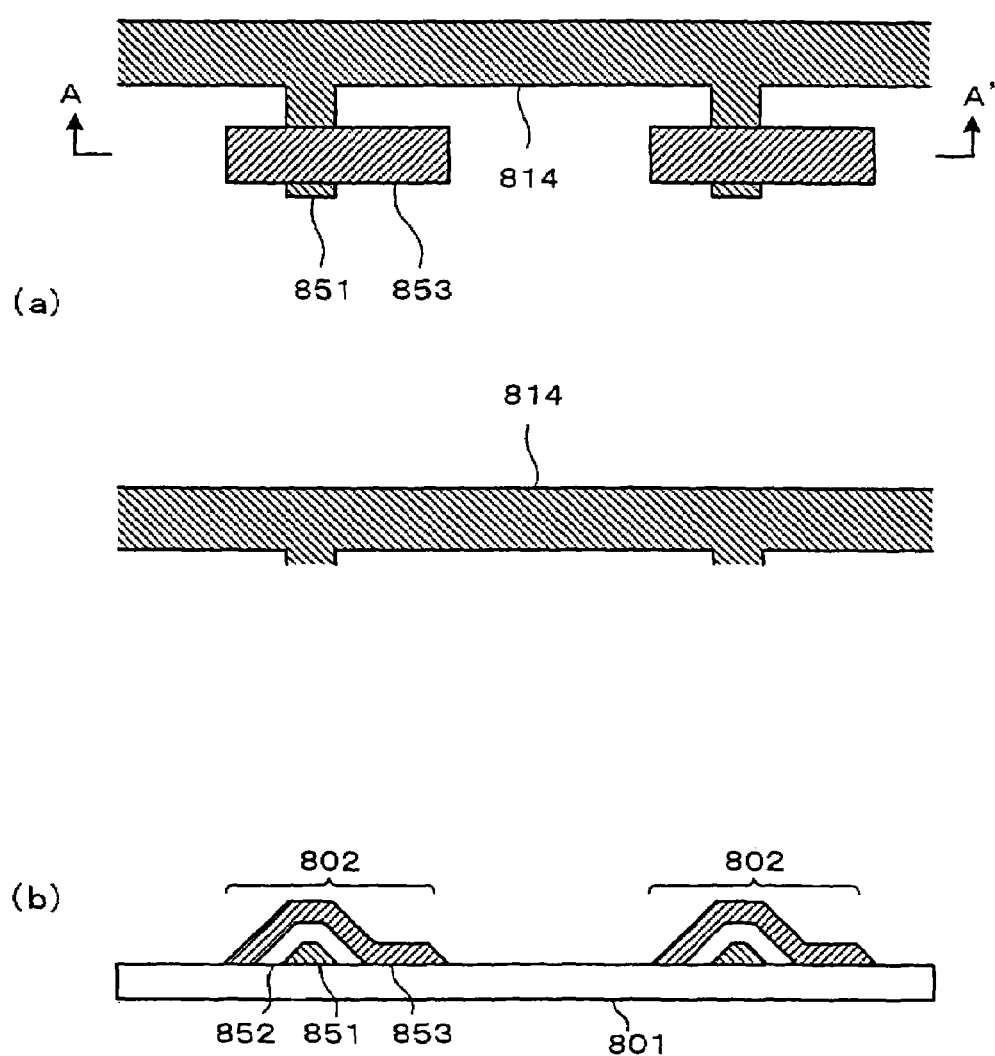
FIG. 13 shows one example of the manufacturing process of a modification of the fourth embodiment.
Figure 14:
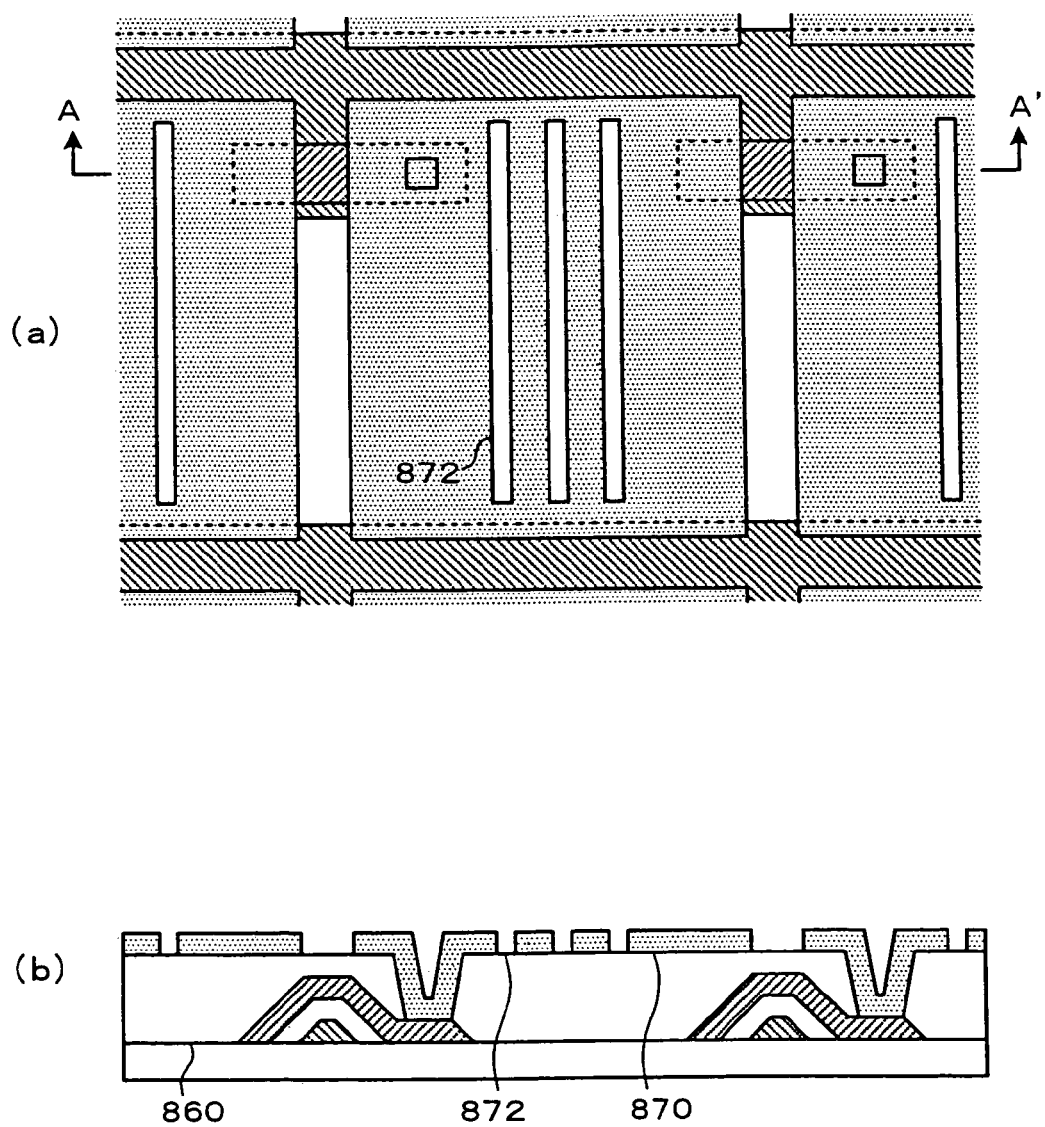
FIG. 14 shows one example of the manufacturing process of a modification of the fourth embodiment.
Figure 15:
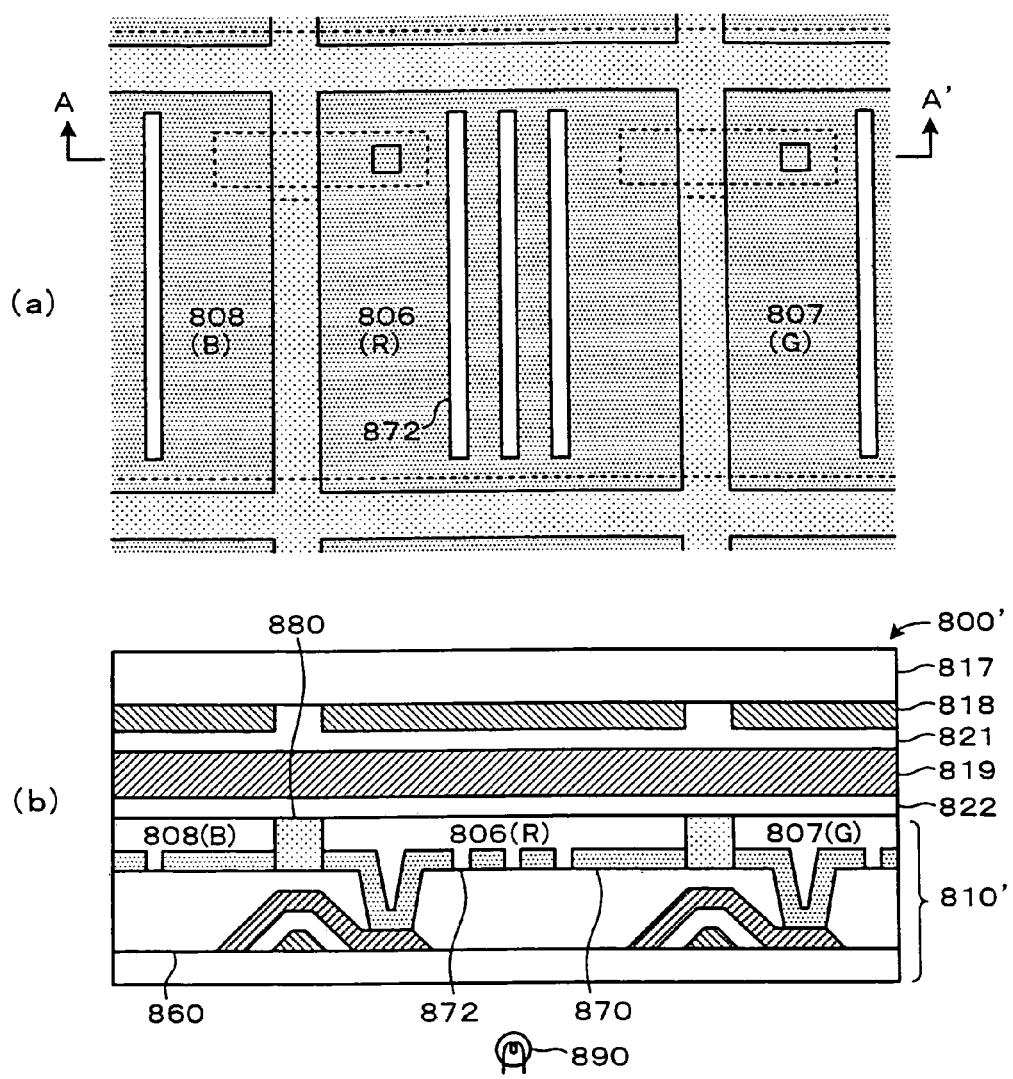
FIG. 15 shows one example of the manufacturing process of a modification of the fourth embodiment; and, FIG. 16 is a perspective view of a notebook-type personal computer which is electronic equipment manufactured by the manufacturing method of an embodiment of this invention.

FIG. 13 through FIG. 15 show an example of a process to manufacture an active matrix substrate and liquid crystal display device in a modification of the fourth embodiment; in each figure, (a) is a plane view, and (b) is a cross-sectional view along line A–A'. Components similar to those in FIG. 9 through FIG. 12 are assigned the same symbols, and explanations are omitted. In this modification, a semi-transmissive active matrix liquid crystal display device is configured by forming the conductive layer 812 of the fourth embodiment from metal or some other non-translucent material, and forming the layer in a shape which imparts partial translucence, as the conductive layer 870.

As shown in FIG. 13, in order to fabricate the active matrix substrate of this modification, a second conductive film 853 comprised by the TFDs is formed, similarly to FIG. 9.

Next, an optically transmissive insulating film 860 is formed, as shown in FIG. 14. A configuration is also possible in which this insulating film 860 is not provided. However, in a semi-transmissive as well as a reflective-type liquid crystal display device, it is desirable that the efficiency of usage of reflected light be increased. That is, it is preferable that the area of the portions used as pixel electrodes be broadened. Hence the insulating film 860 is formed in order that the upper parts of electrodes comprised by neighboring TFDs or wiring (in FIG. 14, the second conductive film 853) also act as pixel electrodes.

After the insulating film 860 is formed, contact holes for connection to the second conductive film 853 are opened in the insulating film 860, and a conductive layer 870 is formed for electrical connection to the second conductive film 853.

In order to obtain a semi-transmissive liquid crystal display device which also utilizes reflected light for display, this conductive layer 870 should be formed from aluminum (Al) or other material with as high an optical reflectivity as possible. Also, though not shown in the figure, a diffused reflective surface, having fine protrusions and depressions, is formed in the surface of the conductive layer 870 in order that the display quality be more satisfactory when utilizing reflected light for display.

Also, slits 872 are formed in the conductive layer 870, in order that light is partially transmitted. These slits 872 are formed in the process of patterning the conductive layer 870.

The shape which imparts translucence to the conductive layer 870 is not limited to slits, and may be any shape, so long as there is partial removal of the conductive layer 870. Also, the area of partial removal of the conductive layer 870 is determined according to the value to be set for the transmittance for light passing through pixel regions (light from the backlight).

Next, as shown in FIG. 15, an insulating film 880 is formed in a shape running along the outside of the conductive layer 870. This insulating film 880 is formed in the boundary portions between pixels so as to function as the black matrix and as a bank.

Conductive inks are then discharged by the ink jet method into each pixel, dried and hardened to form the conductive colored layers 806 through 808, completing the active matrix substrate 810' comprised by a semi-transmissive liquid crystal display device.

Next, an alignment film 822 is formed or the active matrix substrate 810' and subjected to rubbing processing, similarly to FIG. 12. Scan lines 818 are provided on the transparent opposing substrate 817, on top of which an alignment film 821 is formed and subjected to rubbing processing; the active matrix substrate 810' and opposing substrate 817 are placed facing each other, and liquid crystals 819 are enclosed between them to form the liquid crystal display device 800'.

A polarizer, not shown, is provided on the outside of the opposing substrate 817. Because this modification concerns a semi-transmissive liquid crystal display device, a backlight 890 is added.

Although not shown, if slits are not formed in the conductive layer 870, a reflective-type liquid crystal display device can be obtained.

5. Electronic Equipment

Figure 16:
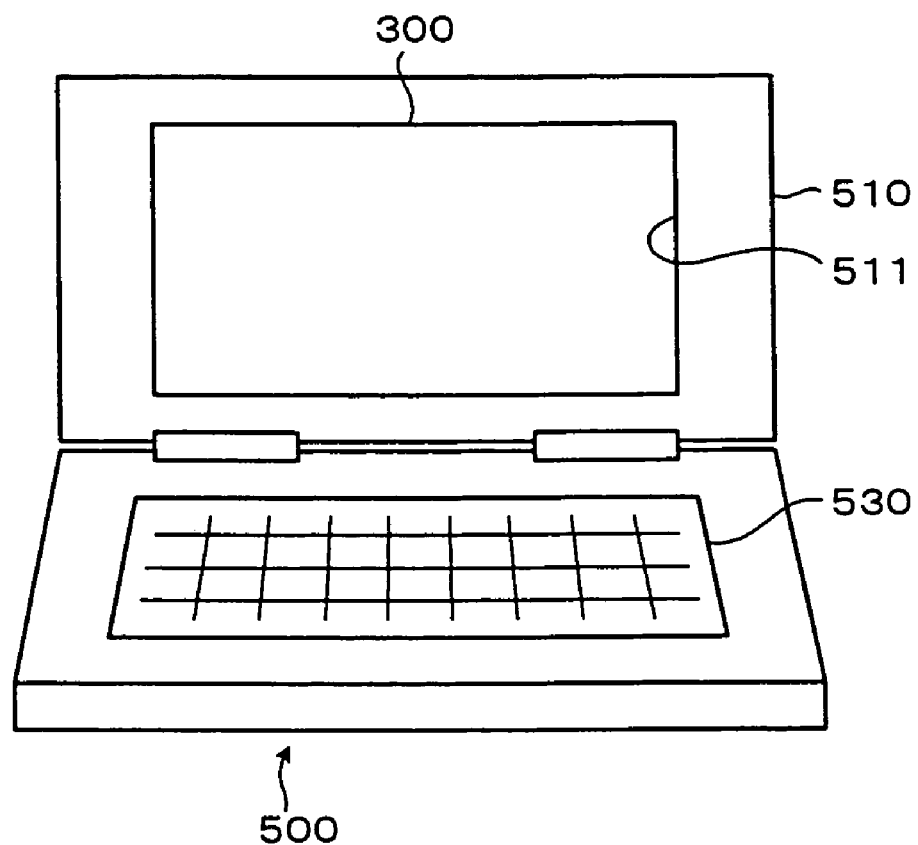

FIG. 16 is a perspective view of a notebook-type personal computer, which is electronic equipment manufactured by the manufacturing method of the first embodiment of this invention. This personal computer 500 employs the above color liquid crystal display device as the display unit, so that there are the advantages of an expanded range of materials for selection, and higher production yields.

As shown in the figure, the liquid crystal display device 300 is housed in a case 510, configured such that the display area or the liquid crystal display device 300 is exposed from an aperture 511 formed in the case 510. The personal computer 500 comprises a keyboard 530 as an input unit.

This personal computer 500 comprises, in addition to the liquid crystal display device 300, a display signal generation unit, which comprises a display, information output source, display information processing circuit, clock generation circuit and other circuits, as well as a power supply circuit to supply power to these circuits. A display image is formed by supplying display signals, generated by the display signal generation unit based on information input from the input unit 530, for example, to the liquid crystal display device 300.

The electronic equipment incorporating an electro-optical device of this embodiment is not limited to a personal computer, but may include various other electronic equipment, including portable telephone sets, PDAs (personal digital assistants), pagers, POS terminals, IC cards, mini-disc players, liquid crystal projectors, engineering workstations (EWS), word processors, television sets, videotape recorders with viewfinders or direct-view monitors, electronic calculators, car navigation equipment, devices comprising touch panels, clocks, and game equipment.

By this invention, a method of manufacture of an active matrix substrate and a method of manufacture of a liquid crystal display device using this substrate can be provided, in which complexity can be avoided in the manufacturing process, the range for selection of materials can be expanded, and which affords high manufacturing yields.

What is claimed is:

1. A method of manufacture of an active matrix substrate, in which active elements are formed in a matrix, comprising:
    forming an active element comprising a first electrode wire, a second electrode wire, and a first insulating layer on the substrate;
    forming a second insulating layer that serves as a protective film for the first electrode wire of the active element;
    discharging, into an area of formation of a pixel electrode to be electrically connected to the active element, ink in which are intermixed color material and conductive material by an ink jet method, the conductive material being in a plate or bar form; and
    forming a conductive colored layer by drying and solidifying the discharged ink.

2. The method of manufacture of an active matrix substrate according to claim 1, the second insulating layer being formed along the first electrode wire and the second electrode wire intersecting in a matrix form.

3. The method of manufacture of an active matrix substrate according to claim 1, wherein the conductive material is in a particulate form.

4. A method of manufacture of an active matrix substrate, in which active elements are formed in a matrix, comprising:
    forming an active element comprising a first electrode wire, a second electrode wire, and a first insulating layer on the substrate;
    forming a second insulating layer that serves as a protective film for the first electrode wire of the active element;
    discharging, into an area of formation of a pixel electrode to be electrically connected to the active element, ink in which are intermixed color material and conductive material by an ink jet method, the conductive material being in a particulate form, the particulate having a hydrophobic surface; and forming a conductive colored layer by drying and solidifying the discharged ink.

5. A method of manufacture of a liquid crystal display device, comprising enclosing a liquid crystal layer between the active matrix substrate manufactured by the method of claim 1 and an opposing substrate being oppositely positioned to the active matrix substrate.

6. A method of manufacture of electronic equipment, comprising employing the liquid crystal display device manufactured by the method of claim 5 as display means.

7. The method of manufacture of an active matrix substrate according to claim 4, the second insulating layer being formed along the first electrode wire and the second electrode wire intersecting in a matrix form.

8. A method of manufacture of a liquid crystal display device, comprising enclosing a liquid crystal layer between the active matrix substrate manufactured by the method of claim 4 and an opposing substrate being oppositely positioned to the active matrix substrate.

9. A method of manufacture of electronic equipment, comprising employing the liquid crystal display device manufactured by the method of claim 8 as display means.

* * * * *